US007779819B2

(12) United States Patent
Serra et al.

(10) Patent No.: US 7,779,819 B2

(45) Date of Patent: Aug. 24, 2010

(54) CONTROL METHOD FOR AN OVERPRESSURE VALVE IN A COMMON-RAIL FUEL SUPPLY SYSTEM

(75) Inventors: Gabriele Serra, S. Lazzaro Di Savena (IT); Matteo De Cesare, Torremaggiore (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 0 days.

(21) Appl. No.: 12/168,086

(22) Filed: Jul. 4, 2008

(65) Prior Publication Data

US 2009/0013966 A1 Jan. 15, 2009

(30) Foreign Application Priority Data

Jul. 5, 2007 (EP) ................................. 07425415

(51) Int. Cl.
*F02M 37/00* (2006.01)
*F02M 57/02* (2006.01)
*F02M 59/36* (2006.01)
*G01M 15/00* (2006.01)

(52) U.S. Cl. ....................... 123/514; 123/458; 123/446; 73/114.43

(58) Field of Classification Search ................. 123/458, 123/447, 510, 514, 511, 497, 198 D; 73/114.38, 73/114.41
See application file for complete search history.

(56) References Cited

U.S. PATENT DOCUMENTS 4,094,191 A * 6/1978 Goetsch et al. .......... 73/114.43
5,493,902 A * 2/1996 Glidewell et al. ........ 73/114.43
6,988,396 B2 * 1/2006 Matsubara et al. ....... 73/114.39
7,137,294 B2 * 11/2006 Eser et al. ................ 73/114.51
7,293,548 B2 * 11/2007 Oono ......................... 123/446
2006/0065242 A1 * 3/2006 Nagai ......................... 123/458
2007/0079808 A1 * 4/2007 Takahashi .................. 123/447

FOREIGN PATENT DOCUMENTS

DE 197 57 594 A1 7/1999
DE 103 03 443 B3 10/2004
WO WO 2007/007558 A 1/2007

* cited by examiner

*Primary Examiner*—Mahmoud Gimie
*Assistant Examiner*—Sizo B Vilakazi
(74) *Attorney, Agent, or Firm*—FSP LLC

(57) ABSTRACT

Control method for an overpressure valve in a common-rail fuel supply system, the method including the phases of: delivering fuel under pressure, via a high-pressure pump, to a common rail equipped with the overpressure valve that is set to discharge the fuel present in the common rail into a discharge line when the fuel pressure inside the common rail exceeds a safety value; piloting, during a diagnostic test, the high-pressure pump to increase the fuel pressure inside the common rail beyond the safety value in order to trigger operation of the overpressure valve; determining, during the diagnostic test, the flow of the high-pressure pump and/or the fuel pressure inside the common rail; and comparing the flow of the high-pressure pump and/or the fuel pressure inside the common rail during the diagnostic test with respective threshold values.

8 Claims, 2 Drawing Sheets

CONTROL METHOD FOR AN OVERPRESSURE VALVE IN A COMMON-RAIL FUEL SUPPLY SYSTEM

PRIORITY CLAIM

This application claims foreign priority benefits under Title 35, United States Code Sections 119 and/or 365 to European application number 07425415.2, filed on Jul. 5, 2007.

TECHNICAL FIELD

The present invention concerns a control method for an overpressure valve in a common-rail fuel supply system.

BACKGROUND ART

In current common rail direct injection fuel systems, a low-pressure pump supplies fuel from a tank to a high-pressure pump, which in turn supplies the fuel to a common rail. A series of injectors (one for each engine cylinder) are connected to the common rail, which are cyclically piloted to inject part of the pressurized fuel in the common rail inside the respective cylinders. For correct combustion, it is important that the pressure level of the fuel inside the common rail be always kept at a desired value that, as a rule, varies as a function of the crank angle.

To keep the pressure value of the fuel inside the common rail equal to the desired value, it has been proposed to size the high-pressure pump to feed the common rail with a quantity of fuel in excess of the effective consumption under all operating conditions; an electromechanical pressure regulator is coupled with the common rail which maintains the pressure level of the fuel inside the common rail equal to the desired value by discharging excess fuel to a return line that re-injects this excess fuel upstream of the low-pressure pump. An injection system of this type has several drawbacks, as the high-pressure pump must be sized to supply the common rail with a slightly excessive quantity of fuel with respect to the maximum possible consumption; however, this condition of maximum possible consumption occurs quite rarely and in all the other remaining running conditions, the quantity of fuel supplied to the common rail by the high-pressure pump is much greater than the actual consumption and therefore a significant portion of this fuel must be discharged by the pressure regulator into the return line. The work carried out by the high-pressure pump to pump the fuel that is successively discharged by the pressure regulator is “useless” work, and therefore this injection system has very low energy efficiency. Furthermore, this injection system tends to overheat the fuel, because when the excess fuel is discharged by the pressure regulator into the return line, this fuel passes from a very high pressure to substantially ambient pressure and, due to the effect of this pressure jump, it heats up.

To resolve the above-described problems, a variable-flow high-pressure pump has been proposed that is able to supply the common rail with just the quantity of fuel necessary to keep the pressure of the fuel inside the common rail equal to the desired value.

For example, patent application EP0481964A1 describes a high-pressure pump equipped with an electromagnetic actuator able to vary the flow of the high-pressure pump moment by moment, by changing the instant of closure of an inlet valve on the high-pressure pump itself. In other words, the flow of the high-pressure pump is varied by changing the instant of closure of the inlet valve of the high-pressure pump itself; in particular, the flow is decreased by delaying the instant of closure of the inlet valve and increased by advancing the instant of closure of the inlet valve.

Another example of a variable-flow high-pressure pump is given by patent U.S. Pat. No. 6,116,870A1. The high-pressure pump described by U.S. Pat. No. 6,116,870A1 comprises a cylinder equipped with a piston having a reciprocating motion inside the cylinder, an intake line, a feed line connected to the common rail, an inlet valve able to allow the flow of fuel into the cylinder, a one-way discharge valve connected to the feed line and able to allow fuel flow only in output from the cylinder, and a regulator device connected to the inlet valve to keep the inlet valve open during a compression phase of the piston and therefore to allow fuel flow in output from the cylinder through the intake line. The inlet valve comprises a valve body that can move along the intake line and a valve seat, which is suitable for being engaged by the valve body to form a fluid-tight seal and is located at the end of the intake line opposite to the end communicating with the cylinder. The regulator device includes a control element, which is coupled to the valve body and is mobile between a passive position, in which it allows the valve body to engage the valve seat in a fluid-tight manner, and an active position, in which it does not allow the valve body to engage the valve seat in a fluid-tight manner; the control element is coupled to an electromagnetic actuator, which is able to move the control element between the passive position and the active position.

In cases of malfunctioning (mechanical, electrical or electronic) of the variable-flow high-pressure pump, the same variable-flow high-pressure pump could feed a much larger quantity of fuel than is necessary to the common rail, thus causing a rapid increase in fuel pressure inside the common rail; once this fault situation on the high-pressure pump is detected, the low-pressure pump is immediately switched off to interrupt the flow of fuel to the high-pressure pump and therefore block the uncontrolled rise of fuel pressure inside the common rail. However, switching off the low-pressure pump has a slightly delayed effect (equal to several pumping cycles in the high-pressure pump), and therefore without further actions of limitation, the fuel pressure inside the common rail could reach levels exceeding the maximum value physically supportable by the components of the injection system, with consequent rupture of these components and the discharge of fuel under high pressure into the engine compartment. To limit the maximum pressure of the fuel inside the common rail in cases of high-pressure pump malfunction, an electromechanical pressure regulator controlled by a control unit or, more frequently due to lower component costs, a mechanical pressure relief is always present in known injection systems.

The cases where the electromechanical pressure regulator or mechanical pressure relief is triggered are extremely rare; following such scarce usage, these components could have mechanical trouble due to moving mechanical parts sticking due to age and therefore might not be able to operate in a sufficiently efficient manner in case of need (i.e. in cases of malfunction in the high-pressure pump that causes a sudden increase in the fuel pressure inside the common rail).

DISCLOSURE OF INVENTION

The object of present invention is to provide a control method for an overpressure valve in a common-rail fuel supply system, this control method being devoid of the above-described drawbacks and, in particular, being of simple and economic embodiment, and allowing possible malfunctioning of the overpressure valve to be detected in an efficient and effective manner.

According to the present invention, a control method for an overpressure valve in a common-rail fuel supply system is provided, in accordance with that recited by the attached claims.

BRIEF DESCRIPTION OF THE DRAWINGS

The present invention will now be described with reference to the enclosed drawings, which illustrate a non-limitative example of embodiment, in which.

PREFERRED EMBODIMENTS OF THE INVENTION

Figure 1:
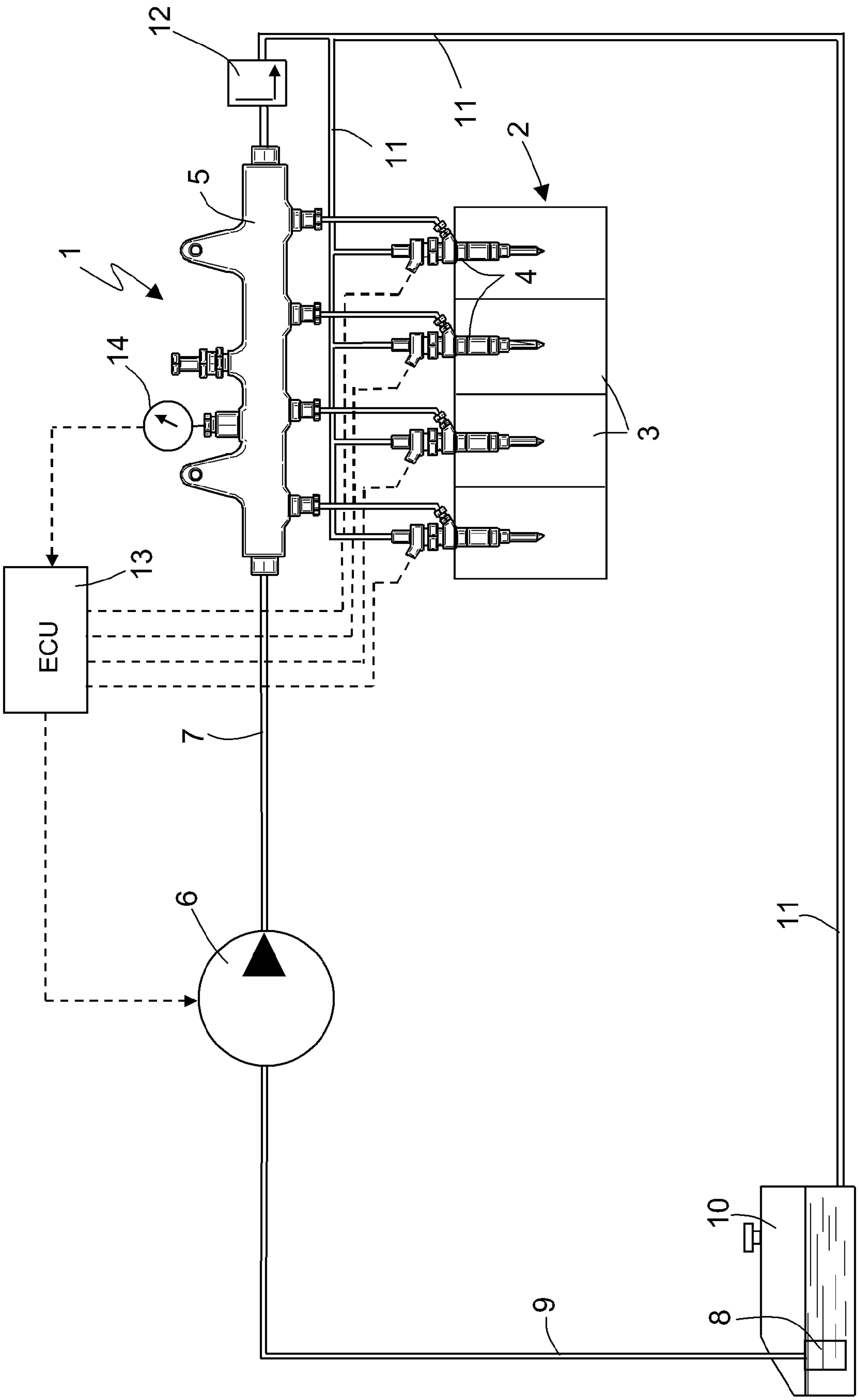
FIG. 1 is a schematic view of a common rail direct fuel injection system that implements the control method forming the subject-matter of the present invention.

In FIG. 1, reference numeral 1 indicates, in its entirety, a common rail system for direct fuel injection in an internal combustion engine 2 fitted with four cylinders 3. The injection system 1 includes four injectors 4, each of which has hydraulic needle actuation and is able to inject fuel directly into a respective cylinder 3 of the engine 2 and receives fuel under pressure from a common rail 5.

A variable-flow high-pressure pump 6 feeds fuel to the common rail 5 through a feed line 7. In turn, the high-pressure pump 6 is fed by a low-pressure pump 8 through a fuel inlet line 9 of the high-pressure pump 6. The low-pressure pump 8 is placed inside a fuel tank 10, into which a discharge line 11 for excess fuel in the injection system 1 flows, which receives excess fuel from both the injectors 4 and a mechanical overpressure valve 12 that is hydraulically connected to the common rail 5. The overpressure valve 12 is set to open automatically when the fuel pressure inside the common rail 5 exceeds a safety value $p_{safety}$ that guarantees the tightness and safety of the injection system 1.

Each injector 4 is able to inject a variable quantity of fuel into the corresponding cylinder 3 under the control of an electronic control unit 13. The electronic control unit 13 is connected to a pressure sensor 14 that detects the fuel pressure inside the common rail 5 and feedback-controls the flow of the high-pressure pump 6 in function of the fuel pressure inside the common rail 5; in this way, the fuel pressure inside the common rail 5 is kept equal to a desired level, which generally varies with time as a function of the crank angle (i.e. the operating conditions of the engine 2). By way of example, the high-pressure pump 6 includes an electromagnetic actuator (not shown) capable of varying the fuel flow $m_{HP}$ of the high-pressure pump 6 moment by moment by changing the moment of closure of an inlet valve (not shown) of the same high-pressure pump 6; in particular, the fuel flow $m_{HP}$ is decreased by delaying the moment of closure of the inlet valve (not shown) and is increased by advancing the moment of closure of the inlet valve (not shown).

As previously mentioned, the injectors 4 have hydraulic needle actuation and are thus connected to the discharge line 11, which has a pressure slightly above the ambient pressure and runs to a point upstream of the low-pressure pump 8 directly inside the tank 10. For its actuation, or rather to inject fuel, each injector 4 takes up a certain amount of pressurized fuel that is discharged into the discharge line 11.

The electronic control unit 13 calculates a desired value for the fuel pressure inside the common rail 5 moment by moment, as a function of the crank angle, and consequently operates to ensure that the effective level of the fuel pressure inside the common rail 5 follows the desired value with rapidity and precision.

The variation dP/dt in fuel pressure inside the common rail 5 is provided by the following equation of state for the common rail 5:

$$dP/dt=(k_b/Vr)\times(m_{HP}-m_{Inj}-m_{Leak}-m_{BackFlow}-m_{OPV}) \quad [1]$$

dP/dt is the change in fuel pressure inside the common rail 5, $k_b$ is the bulk modulus of the fuel, Vr is the volume of the common rail 5, $m_{HP}$ is the fuel flow of the high-pressure pump 6, $m_{Inj}$ is the fuel flow injected into the cylinders 3 by the injectors 4, $m_{Leak}$ is the fuel flow lost due to leaks on the injectors 4, $m_{BackFlow}$ is the fuel flow taken in by the injectors 4 for their operation and discharged into the discharge line 11, and $m_{OPV}$ is the fuel flow discharged by the overpressure valve 12 into the discharge line 11.

From the above-specified equation, it is clear that the variation dP/dt in fuel pressure inside the common rail 5 is positive if the fuel flow $m_{HP}$ of the high-pressure pump 6 is greater than the sum of the fuel flow $m_{Inj}$ injected into the cylinders 3 by the injectors 4, the fuel flow $m_{Leak}$ lost due to leaks on the injectors 4, the fuel flow $m_{BackFlow}$ taken up by the injectors 4 for their operation and discharged into the discharge line 11, and the fuel flow $m_{OPV}$ discharged by the overpressure valve 12 into the discharge line 11. It is important to note that the fuel flow $m_{Inj}$ injected into the cylinders 3 by the injectors 4 and the fuel flow $m_{BackFlow}$ taken up by the injectors 4 for their operation and discharged into the discharge line 11 are extremely variable (they can also be null), depending on the method of piloting the injectors 4, while the fuel flow $m_{Leak}$ for leaks on the injectors 4 is fairly constant (it only has a slight increase as the fuel pressure inside the common rail 5 grows) and is always present (i.e. it is never null).

Cyclically (for example, every so many hours of running of the internal combustion engine 2), the electronic control unit 13 performs a diagnostic test to check if the overpressure valve 12 functions correctly or has a malfunction. A diagnostic test provides for piloting the high-pressure pump 6 to increase the fuel pressure inside the common rail 5 beyond the safety value $p_{safety}$ so as to trigger operation of the overpressure valve 12. In other words, during a diagnostic test, the electronic control unit 13 feedback-pilots the high-pressure pump 6 to attempt to reach a target pressure $p_{target}$ having a higher value that the safety value $p_{safety}$ in order to trigger operation of the overpressure valve 12.

During a diagnostic test, the electronic control unit 13 determines the flow $m_{HP}$ of the high-pressure pump 6 and the fuel pressure inside the common rail 5; after a certain time interval (which takes the exhaustion of transients into account) from the start of the diagnostic test, the flow $m_{HP}$ of the high-pressure pump 6 and the fuel pressure inside the common rail 5 have substantially stable values. At this point, the electronic control unit 13 compares the flow $m_{HP}$ of the high-pressure pump 6 and/or the fuel pressure inside the common rail 5 during the diagnostic test with the respective threshold values $m_{test}$ and $p_{test}$; the electronic control unit 13 diagnoses a malfunction of the overpressure valve 12 if the flow $m_{HP}$ of the high-pressure pump 6 is lower than the respective flow threshold value $m_{test}$ and/or the fuel pressure inside the common rail 5 is greater than the respective pressure threshold value $p_{test}$.

In other words, if the overpressure valve 12 operates correctly, then when the fuel pressure inside the common rail 5 exceeds the safety value $p_{safety}$, the overpressure valve 12 opens, discharging the fuel present in the common rail 5 into the discharge line 11 at ambient pressure; in consequence, even if the high-pressure pump 6 increases its own fuel flow $m_{HP}$ to the maximum, it cannot increase the fuel pressure inside the common rail 5 beyond the safety value $p_{safety}$. Instead, if the overpressure valve 12 does not operate correctly, then even when the fuel pressure inside the common rail 5 exceeds the safety value $p_{safety}$, the overpressure valve 12 does not open (or opens partially); in consequence, the high-pressure pump 6 succeeds in further increasing the fuel pressure inside the common rail 5 beyond the safety value $p_{safety}$ (and beyond the pressure threshold value $p_{test}$) delivering a relatively modest fuel flow $m_{HP}$ (i.e. less than the flow threshold value $m_{test}$).

It is important to underline that to diagnose a malfunction in the overpressure valve 12, the electronic control unit 13 can only perform a comparison between the flow $m_{HP}$ of the high-pressure pump 6 and the flow threshold value $m_{test}$, or can only perform a comparison between the fuel pressure inside the common rail 5 and the pressure threshold value $p_{test}$, or can perform both of these comparisons.

In order that the comparison between the fuel pressure inside the common rail 5 and the pressure threshold value $p_{test}$ is meaningful, it is necessary that the target pressure $p_{target}$ (in any case greater than the safety value $p_{safety}$) is at least equal to the pressure threshold value $p_{test}$. Normally, the value of the pressure threshold $p_{test}$ and the target pressure $p_{target}$ are at least equal to the safety value $p_{safety}$ incremented by the pressure tolerance of the overpressure valve 12 (i.e. both greater than the safety value $p_{safety}$). The flow threshold value $m_{test}$ must be greater than the fuel flow $m_{Leak}$ lost in leaks on the injectors 4 and, as a rule, is equal to the fuel flow $m_{Leak}$ lost in leaks on the injectors 4 incremented by an amount that increases as the number of revs of the internal combustion engine 2 rises; in consequence, the value of the flow threshold $m_{test}$ increases as the number of revs of the internal combustion engine 2 rises.

In order that the driver has no perception of a diagnostic test being carried out, the same diagnostic test is preferably performed with the internal combustion engine 2 running in a cut-off condition; to speed up the execution of a diagnostic test, the same diagnostic test can be performed during a cut-off condition in which the fuel pressure inside the common rail 5 is close to the maximum operating value.

Figure 2:
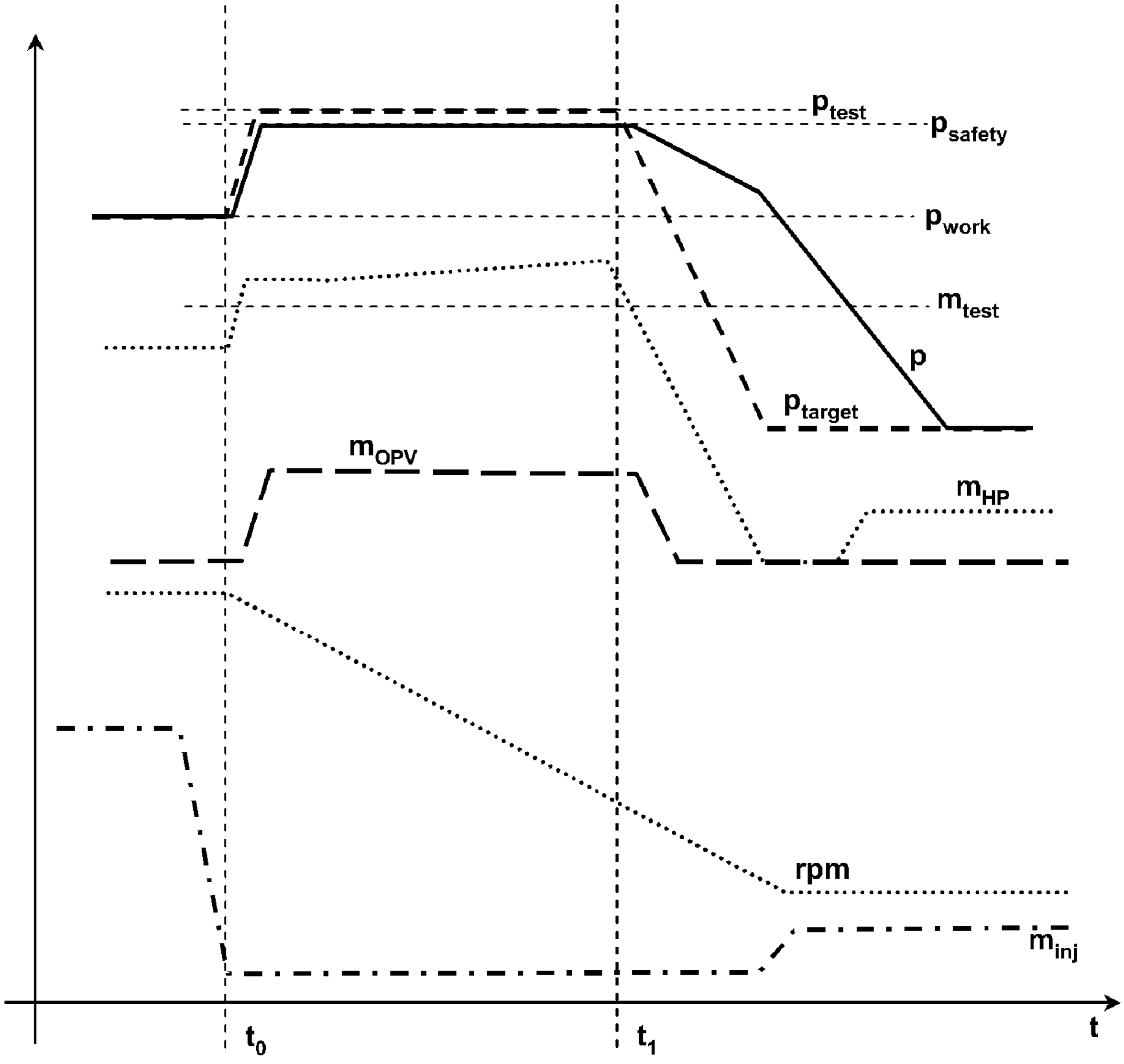
FIG. 2 is a graph that schematically shows the temporal evolution of some of the quantities of the direct fuel injection system in FIG. 1 during a diagnostic test of a high-pressure pump.

That which has been explained above is schematically illustrated in the graph in FIG. 2, in which a diagnostic test that demonstrates correct operation of the overpressure valve 12 is initiated at time to; starting from time to, the high-pressure pump 6 is piloted with a target pressure $p_{target}$, which is higher than the normal operating pressure $p_{work}$, higher than the safety value $p_{safety}$ and substantially equal to the pressure threshold value $p_{test}$.

The continuous line in FIG. 2 shows the time trend of the target pressure $p_{target}$, which during the diagnostic test (between time $t_0$ and time $t_1$) is increased to exceed the normal operating pressure $p_{work}$ and to exceed the safety value $p_{safety}$ by an amount equal to at least the pressure tolerance of the overpressure valve 12.

A dashed line in FIG. 2 shows the time trend of the fuel pressure inside the common rail 5, which during the diagnostic test (between time $t_0$ and time $t_1$) increases until it reaches the safety value $p_{safety}$ and does not increase beyond the safety value $p_{safety}$ due to the triggering of the overpressure valve 12.

A dotted line in FIG. 2 shows the time trend of the fuel flow $m_{HP}$ of the high-pressure pump 6, which during the diagnostic test (between time $t_0$ and time $t_1$) progressively increases as the electronic control unit 13 tries to raise the fuel pressure inside the common rail 5 to reach the target pressure $p_{target}$.

A dashed line in FIG. 2 shows the time trend of the fuel flow $m_{OPV}$ discharged by the overpressure valve 12 into the discharge line 11; during the diagnostic test (between time $t_0$ and time $t_1$), this fuel flow $m_{OPV}$ increases to discharge excess fuel from the common rail 5 and avoid the fuel pressure inside the common rail 5 exceeding the safety value $p_{safety}$.

A dotted line in FIG. 2 shows the time trend of the number of revs of the internal combustion engine 2, while a dot-dashed line shows the time trend of fuel flow $m_{Inj}$ injected into the cylinders 3 by the injectors 4; it can be noted how both the number of revs of the internal combustion engine 2 and the fuel flow $m_{Inj}$ injected into the cylinders 3 by the injectors 4 drop during the diagnostic test (between time $t_0$ and time $t_1$) as the diagnostic test itself is performed in cut-off conditions.

The above-described control strategy for the overpressure valve 12 has numerous advantages as it allows the diagnosis of possible malfunctioning of the same overpressure valve 12 to be performed in an effective (i.e. with a high level of confidence) and efficient (i.e. with minimum commitment of resources) manner. In addition, the above-described control strategy for the overpressure valve 12 is of economic and simple embodiment in a common-rail fuel supply system 1, as it does not require the installation of any additional component with respect to those normally already present.

The invention claimed is:

1. Control method for an overpressure valve in a common-rail fuel supply system, the method including:

delivering fuel under pressure, via a high-pressure pump, to a common rail equipped with the overpressure valve that is set to discharge the fuel present in the common rail into a discharge line when the fuel pressure inside the common rail exceeds a safety value ($p_{safety}$) which guarantees the tightness and safety of the injection system;

determining, during a normal use, the fuel pressure inside the common rail;

feedback-piloting, during the normal use, the high-pressure pump in function of the fuel pressure inside the common rail to keep the fuel pressure inside the common rail to a desired level which is always lower than the safety value ($p_{safety}$);

piloting, during a diagnostic test performed with the internal combustion engine in cut-off condition, the high-pressure pump to increase the fuel pressure inside the common rail beyond the safety value ($p_{safety}$) to reach a target pressure ($p_{target}$) having a higher value that the safety value ($p_{safety}$) in order to trigger operation of the overpressure valve;

determining, during the diagnostic test, the flow ($m_{HP}$) of the high-pressure pump and/or the fuel pressure inside the common rail;

comparing the flow ($m_{HP}$) of the high-pressure pump and/or the fuel pressure inside the common rail during the diagnostic test with respective threshold values ($m_{test}$ and $p_{test}$); and diagnosing malfunctioning of the overpressure valve if the flow ($m_{HP}$) of the high-pressure pump is less than a respective flow threshold value ($m_{test}$) and/or the fuel pressure inside the common rail is greater than a respective pressure threshold ($p_{test}$).

2. Method according to claim 1, wherein during the diagnostic test the high-pressure pump is piloted having at least the pressure threshold value ($p_{test}$) as the target pressure ($p_{target}$).

3. Method according to claim 1, wherein the pressure threshold value ($p_{test}$) is at least equal to the safety value ($p_{safety}$) incremented by the pressure tolerance of the overpressure valve.

4. Method according to claim 1, wherein the flow threshold value ($m_{test}$) is greater than the fuel flow ($m_{Leak}$) lost due to leaks on the injectors.

5. Method according to claim 1, wherein the flow threshold value ($m_{test}$) increases as the number of revs of the internal combustion engine rises.

6. Method according to claim 1, wherein the diagnostic test is performed during a cut-off condition in which the fuel pressure inside the common rail is close to the maximum operating value.

7. Method according to claim 1, wherein malfunctioning of the overpressure valve is diagnosed after a certain time interval from the start of the diagnostic test.

8. Method according to claim 7, wherein after the certain time interval from the start of the diagnostic test, the flow ($m_{HP}$) of the high-pressure pump and/or the fuel pressure inside the common rail have substantially stable values.

* * * * *